United States Patent [19]

Shotbolt

[11] Patent Number: 4,793,737
[45] Date of Patent: Dec. 27, 1988

[54] FLEXIBLE RISER SYSTEM

[75] Inventor: Keith Shotbolt, Gerrards Cross, England

[73] Assignee: Bechtel Limited, London, England

[21] Appl. No.: 57,554

[22] Filed: Jun. 3, 1987

[30] Foreign Application Priority Data

| Jun. 5, 1986 | [GB] | United Kingdom | 8613690 |
| Nov. 17, 1986 | [GB] | United Kingdom | 8627392 |
| Nov. 20, 1986 | [GB] | United Kingdom | 8627696 |
| Jan. 6, 1987 | [GB] | United Kingdom | 8700099 |
| Jan. 6, 1987 | [GB] | United Kingdom | 8700100 |
| Feb. 10, 1987 | [GB] | United Kingdom | 8703026 |
| Feb. 25, 1987 | [GB] | United Kingdom | 8704466 |
| Apr. 16, 1987 | [GB] | United Kingdom | 8709301 |

[51] Int. Cl.$^4$ .................... E21B 43/013; F16L 1/04
[52] U.S. Cl. .................... 405/169; 166/343; 166/367; 405/195
[58] Field of Search ............. 405/158, 169, 170, 195; 166/338, 341, 343, 344, 345, 347, 350, 367

[56] References Cited

U.S. PATENT DOCUMENTS

| 4,266,886 | 5/1981 | Milton | 405/169 |
| 4,277,202 | 7/1981 | Archambaud et al. | 405/169 |
| 4,400,109 | 8/1983 | Gentry et al. | 405/195 |
| 4,400,110 | 8/1983 | Beynet et al. | 405/195 |
| 4,448,568 | 5/1984 | Gentry et al. | 405/169 |
| 4,490,073 | 12/1984 | Lawson | 405/169 |

FOREIGN PATENT DOCUMENTS 2011506 7/1979 United Kingdom .

OTHER PUBLICATIONS

"Dynamic Flexible Risers", Coflexip Brochure, Sep. 1985.
Offshore Engineer, Feb. 1985, p. 31.

Primary Examiner—David H. Corbin
Attorney, Agent, or Firm—Townsend and Townsend

[57] ABSTRACT

A flexible riser 10 has a lower connector 11 which is moved laterally over the seabed by a pull-in sled 7 under a mid-water support buoy 3 to connect it to a connection point 17 on subsea equipment 1. The riser 10 is attached at a point part way along its length to buoy 3. This is done at one side of the buoy prior to construction vessel 13 laying the riser over the buoy and connecting the upper connector 24 to a production vessel 2 positioned over the subsea equipment. Attachment is done by guiding the riser pipe into a channel 36, a projection 20 on the riser engaging the channel against lowering of the pipe. A upper connector of the riser may include a single pivotal arm and a single offset guide post to maintain its orientation while it is being pulled into engagement with a mating part on the production vessel.

23 Claims, 13 Drawing Sheets

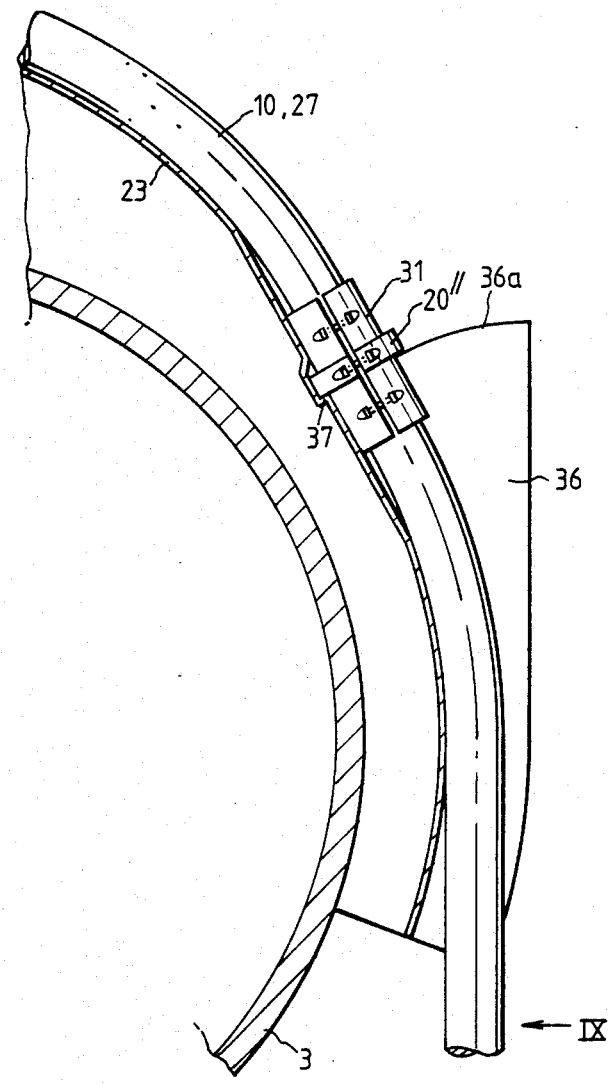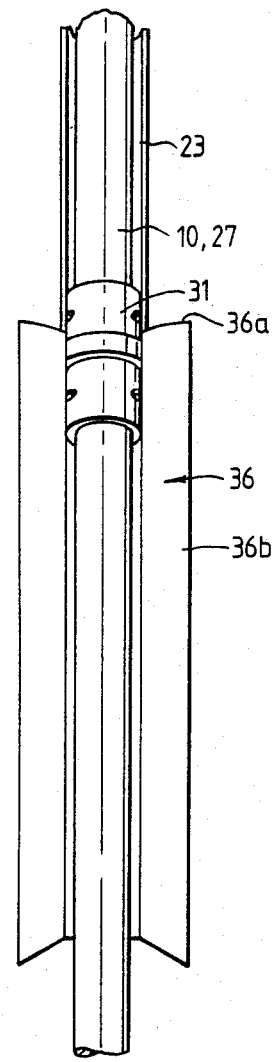
Fig. 9a.
Fig. 9b.

Fig. 12.
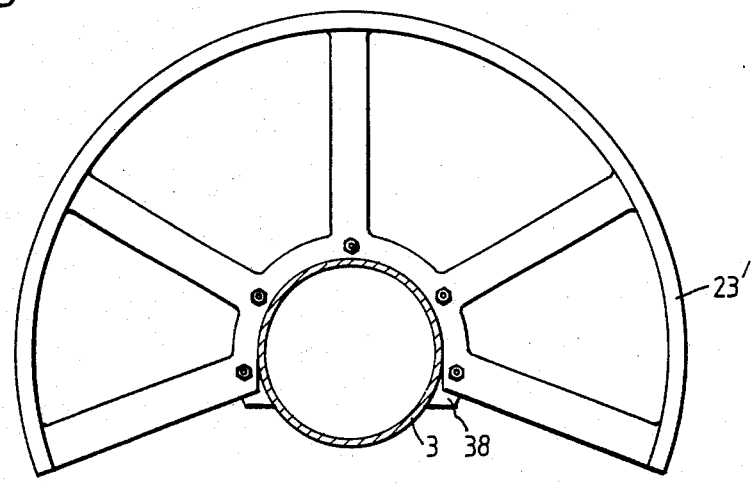
Fig. 13a.
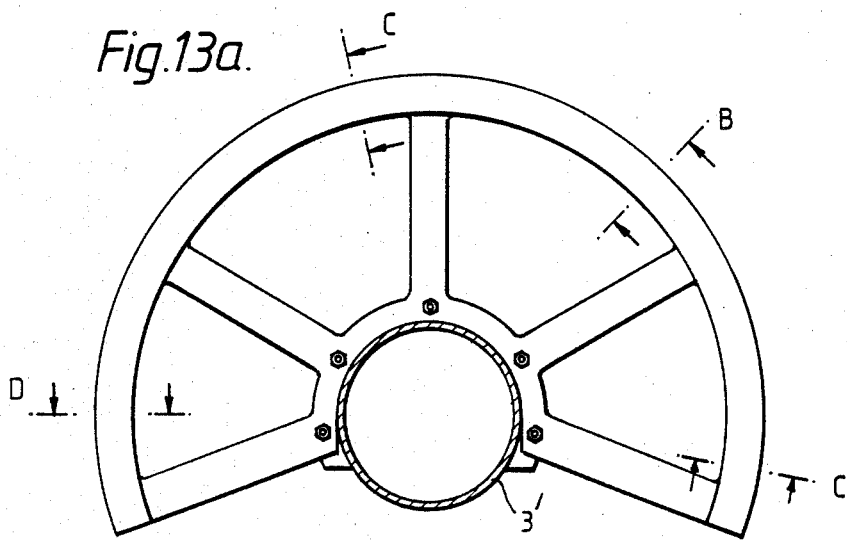
Fig. 13b.
Fig. 13c.
Fig. 13d.
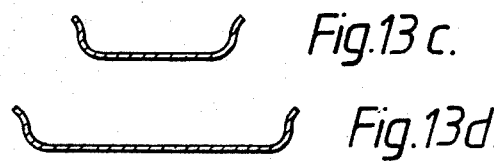

FLEXIBLE RISER SYSTEM

FIELD OF THE INVENTION

This invention relates to systems of flexible risers (within which we include control umbilicals) extending from subsea oil or gas production equipment positioned on the seabed, over a mid-water support and up to a vessel on the surface of the sea, and to methods of installing them.

BACKGROUND OF THE INVENTION

A system wherein flexible ducts from different directions are brought over a low support before rising as seen in GB-A No. 2011506. Other designs and configurations for flexible risers have been described by Coflexip in their brochure "Dynamic Flexible Risers" printed in September 1985. These include five configurations named as follows:

(a) free-hanging
(b) lazy S
(c) steep S
(d) lazy wave
(e) steep wave.

The last four all have mid-water supports. In addition "Offshore Engineer" of February 1985 shows a form of lazy S configuration wherein the lower leg, below the mid water support, runs back under that support i.e. towards the region under the vessel.

It is likely that many semi-submersible floating production systems will in future have at least some of their production wells positioned directly beneath the vessel for two reasons:

produced fluids can flow more readily without suffering from the slugflow, hydrate, wax and emulsion problems associated with subsea flowlines;

workover and other subsea equipment maintenance can be performed directly without requiring a second vessel.

The steep S and steep wave configurations, which are designed to be used when wells are beneath the vessel, are difficult to install and require extra connection points at the riser base. It is desired therefore to reduce the number of connections to a minimum and to make installation as simple as possible. It may be necessary to perform the installation without using divers.

SUMMARY OF THE INVENTION

The present invention is concerned to allow lazy S installations to be made comparatively readily on a pre-positioned midwater support. The key to the successful operation is the realisation that both the upper and lower legs may be precisely designed to optimum lengths if the riser is restrained by the support before the upper leg is laid and if that restraint is provided at the lateral side of the support away from the direction in which the upper part of the riser will then be moved to lay it over the support and from the slack catenary of the upper leg which is then attached to the production vessel. The restraint is preferably provided by a channel into which the riser is guided and is then prevented from downward movement by engagement of a stop on the riser with a detent associated with the channel. The channel may be part of a guide channel extending over the support and receiving the riser as it goes into the loop of the slack catenary of the upper leg.

The support may be a tethered buoy or may be a rigid structure.

The free end of the riser at the seabed may be drawn back under the support to achieve connection with equipment vertically under the vessel: this may be achieved by a sled associated with the free end, either temporarily (the end being lowered into a container on the sled borne on a base of the support) or permanently, the sled then being lowered with the end from a construction vessel and preferably then being received on a specially conformed base with orienting guide ribs or channels. Furthermore the base may have stops whereby the sled, initially vertically oriented, may be tipped over by appropriate movement of the construction vessel, so as to present the free end appropriately towards the equipment.

Specific embodiments of the invention will now be described by way of example with reference to the accompanying drawings in which.

Figure 7A:
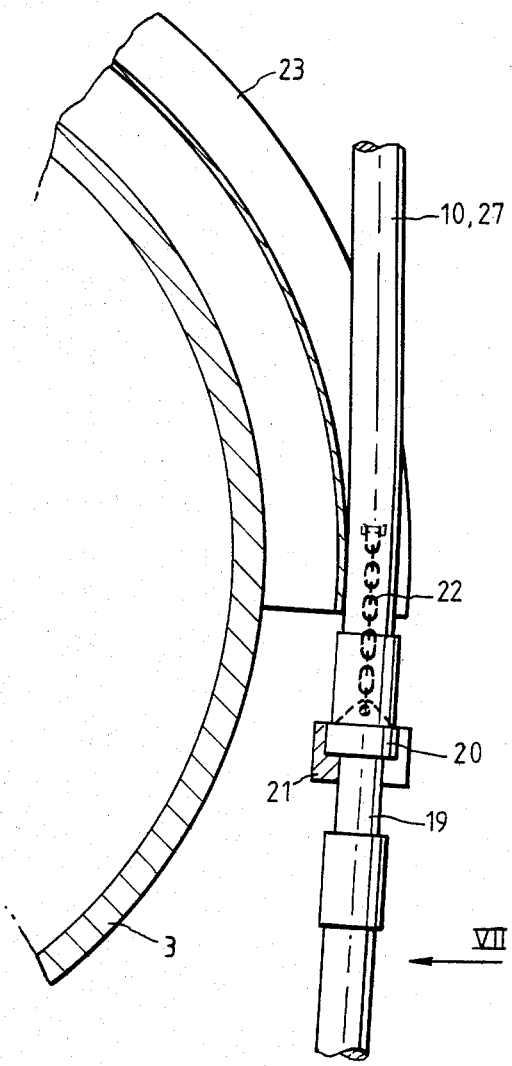
Figure 7B:
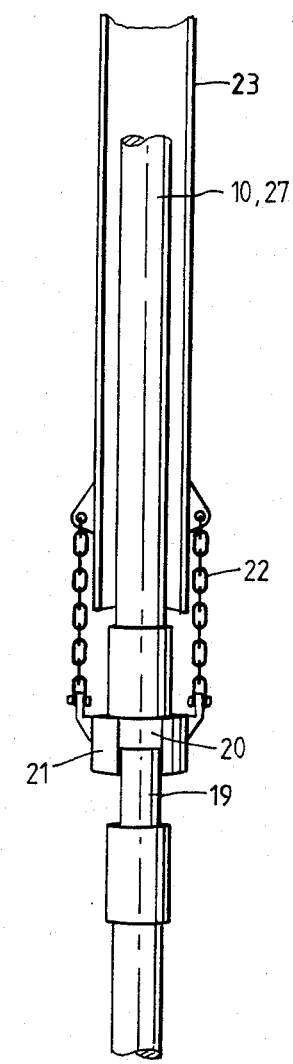
Figure 8A:
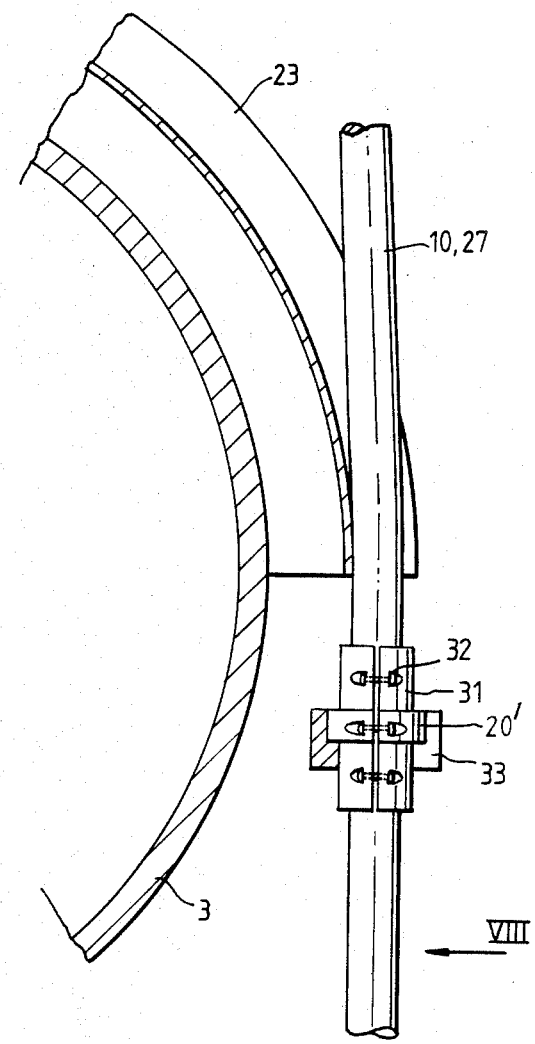
Figure 8B:
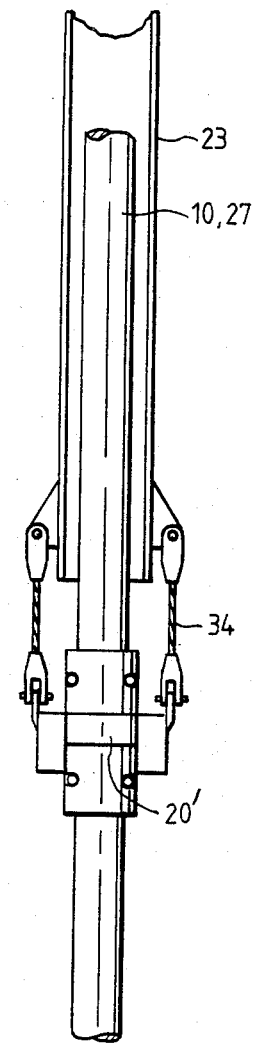
Figure 10:
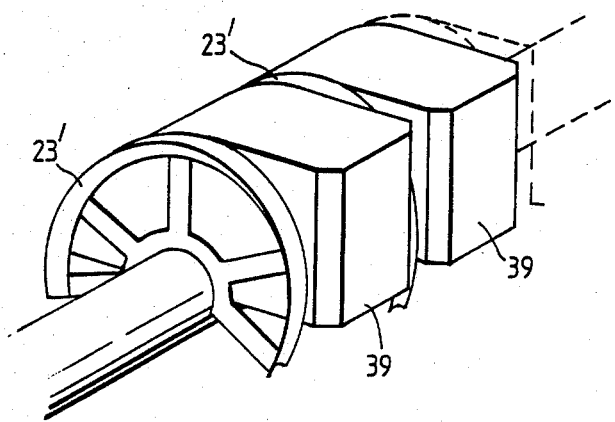
Figure 11:
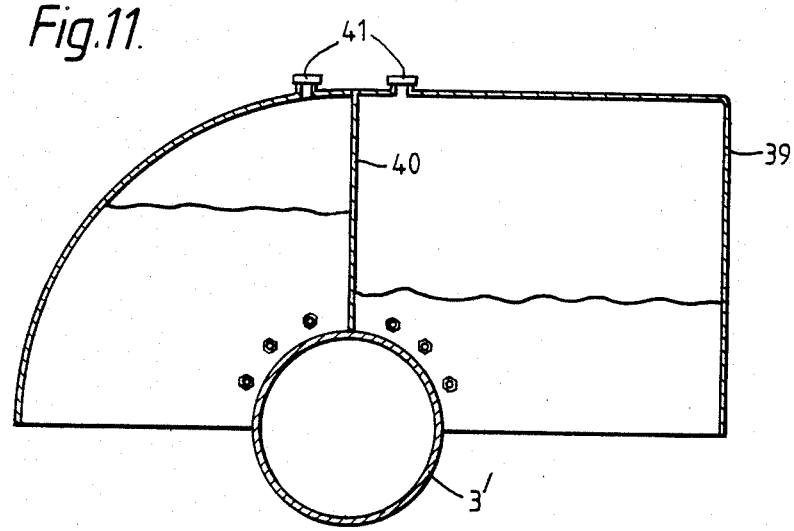
Figure 14:
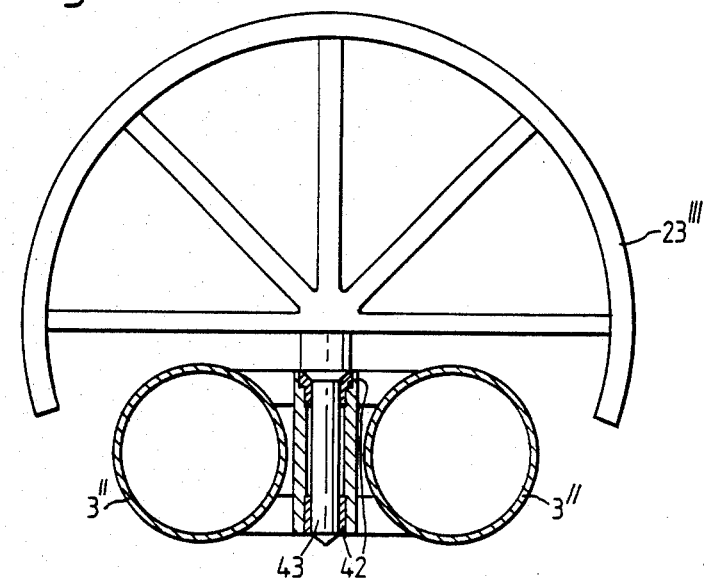
Figure 15:
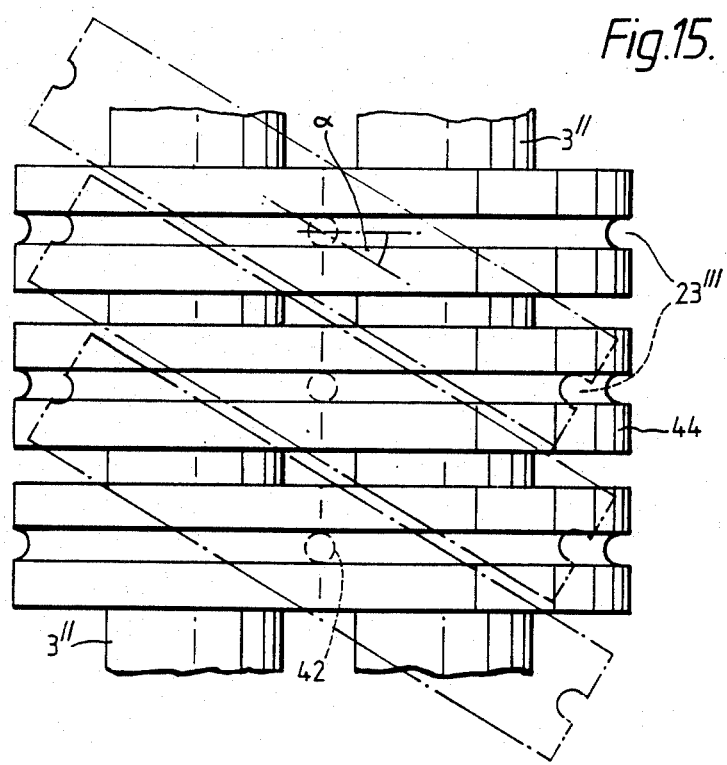
Figure 16:
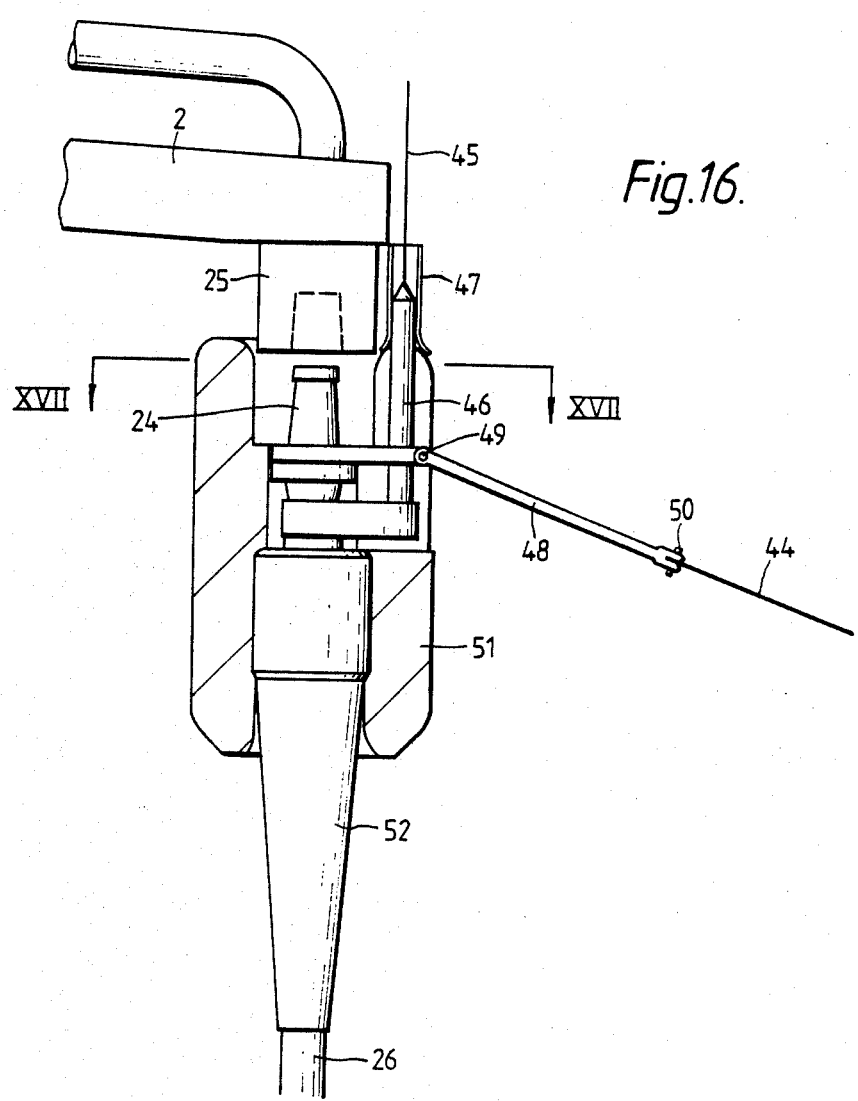

FIGS. 7, 8 and 9 show different forms of catches for attachment of the risers to the side portion of the mid-water support, FIGS. 7a, 8a and 9a being sectional views looking along the support and FIGS. 7a, 8b and 9b being views on the arrows VII, VIII and IX respectively;

FIG. 10 is an isometric view of another embodiment of mid-water support;

FIGS. 11 and 12 are sectional views of the embodiment of FIG. 10 looking along the support;

FIG. 13a is a sectional view analogous to FIG. 11 but of a modified embodiment;

FIGS. 13b–d being sections on the planes B, C and D respectively in FIG. 13a;

FIG. 14 is a sectional view of a further embodiment of mid-water support looking along the support;

FIG. 15 is a plan view of the embodiment of FIG. 14;

FIG. 16 is a diametrical section through an upper-end connector; and

Figure 17:
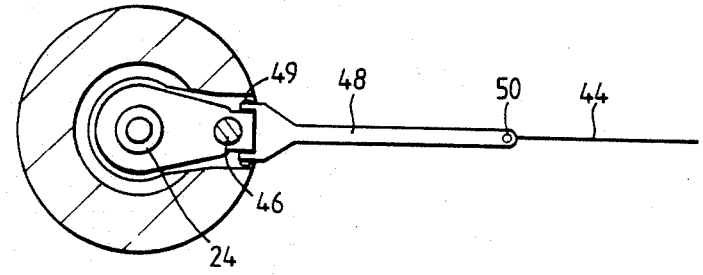

FIG. 17 is a section on the plane XVII—XVII of FIG. 16.

Figure 1:
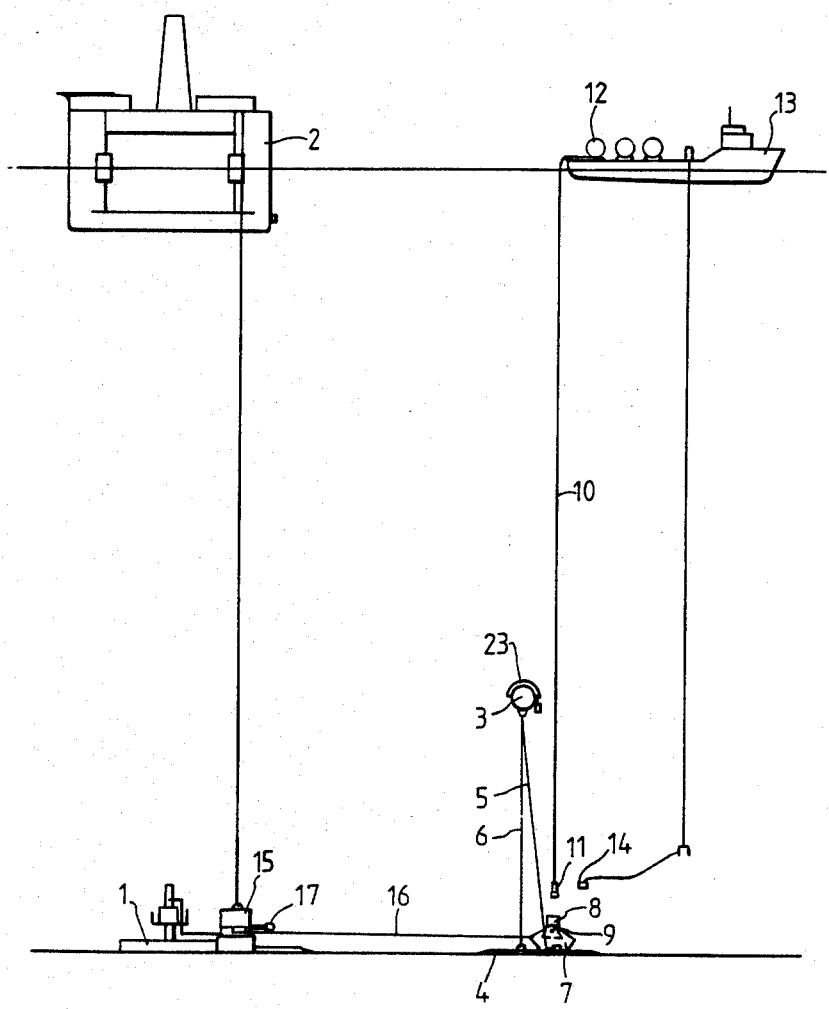
FIG. 1 is a diagrammatic side view showing a riser being unreeled and suspended vertically from a construction vessel.

Referring to FIG. 1, the subsea production equipment 1 (which can be template-mounted) is shown positioned on the seabed and a production vessel 2 is floating directly above. A mid-water support in the form of a buoy 3 is tethered to a seabed base 4 by a main tether system 5 and may include a subsidiary tether system 6 to deflect the buoy. The base 4 must be accurately positioned relative to the subsea production equipment 1 and the connection point 17. This may be done by a sonar positioning system which should be able to work to a tolerance of $+/-1$ meter, or preferably better, over a distance of 100 meters. Alternatively the base 4 can be positioned relative to the subsea equipment 1 by using a seabed spacing frame or mudline cover which could also be used to provide a stable working surface between the base 4 and subsea equipment 1 in soft soil areas.

A receptacle sled 7 initially positioned on the base 4 compresses a runner and a horizontally-pivotable receptacle S mounted on the runner by pivot 9. Items 3,4,5,6,7 may be installed simultaneously on the seabed in a single lift by a crane vessel.

A flexible pipe 10 with a lower connector 11 is lowered vertically from a reel 12 on a construction vessel 13. A remotely-operated vehicle (ROV) 14 is used to monitor the approach of connector 11 towards receptacle 8 and construction vessel 13 manoeuvres, for example using dynamic-positioning, to enable the connector 11 to enter the receptacle B as the connector is lowered. Pipes having multiple bores must be correctly oriented, possibly by incorporating a helical cam (not shown) in the receptacle 8 and a cam follower on the connector 11.

Figure 6:
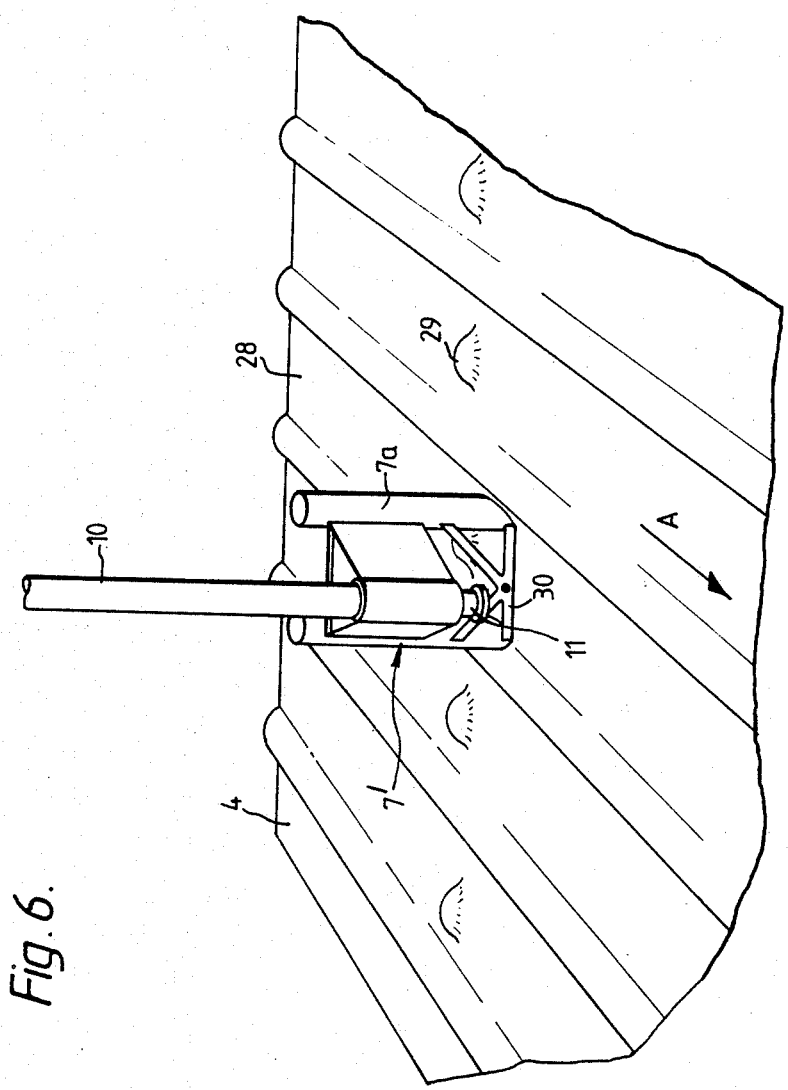
FIG. 6 is a detail perspective view of a possible arrangement at the seabed.

Alternatively, the sled 7 could be lowered down from vessel 13 together with the connector 11 already positioned in it, but the sled would require orientation as it approached base 4 (see FIG. 6).

Figure 2:
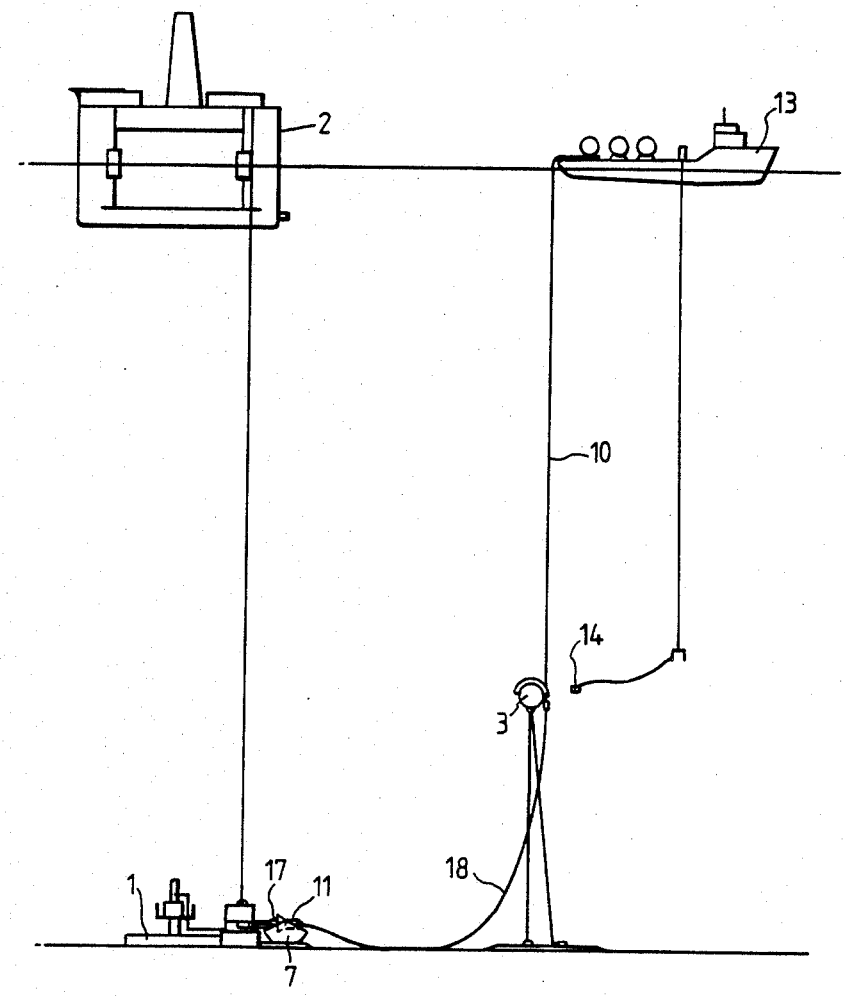
FIG. 2 shows a later stage in the operation.

A second ROV 15 launched from vessel 2 has the ability to attach a pulling line 16 to sled 7 and then to land on the subsea equipment 1 and pull the sled 7 towards a connection point 17 on the equipment 1. As it does so and the riser runs along the seabed behind it the receptacle 8 pivots, to offer the connector 11 horizontally to the connection point 17. A stop prevents the receptacle pivoting beyond the horizontal. FIG. 2 shows the sled 7 after having been pulled into the subsea equipment 1 and connection having been made between the connector 11 and the connection point 17.

Before the upper leg of the riser, i.e. the part above the mid-water support, is brought back towards the vessel 2 it is attached to the support 3 in such a way that the weight of the lower leg is supported by it. This ensures that the catenaries of the legs of the riser are as designed; without the attachment the weight of the lower leg could cause the riser to slide over the support during the laying-over of the upper leg, resulting in a coil of pipe forming on the seabed and shortening the upper one. Shortening the upper leg would deprive the system of its optimum acceptance of surface vessel motion and would undesirably diminish the radius of curvature of the lower leg where it turns as it meets the seabed. To attach the riser, after the connection of the lower leg to the equipment 17, the vessel 13 manoeuvres to position the riser 10 adjacent to the mid-water support 3 prior to attachment and then lays it back over the support in guide cradles 23. The ROV 14 allows visual monitoring of the relationship between the support 3 and riser during that approach. One method of ensuring that the freehanging catenary 18 between the mid-water support 3 and the seabed is shaped as required would be to clamp a marked position of the flexible pipe to the side of the support 3. However this would require manual intervention, and preferred means for achieving the attachment will be described later.

Figure 3:
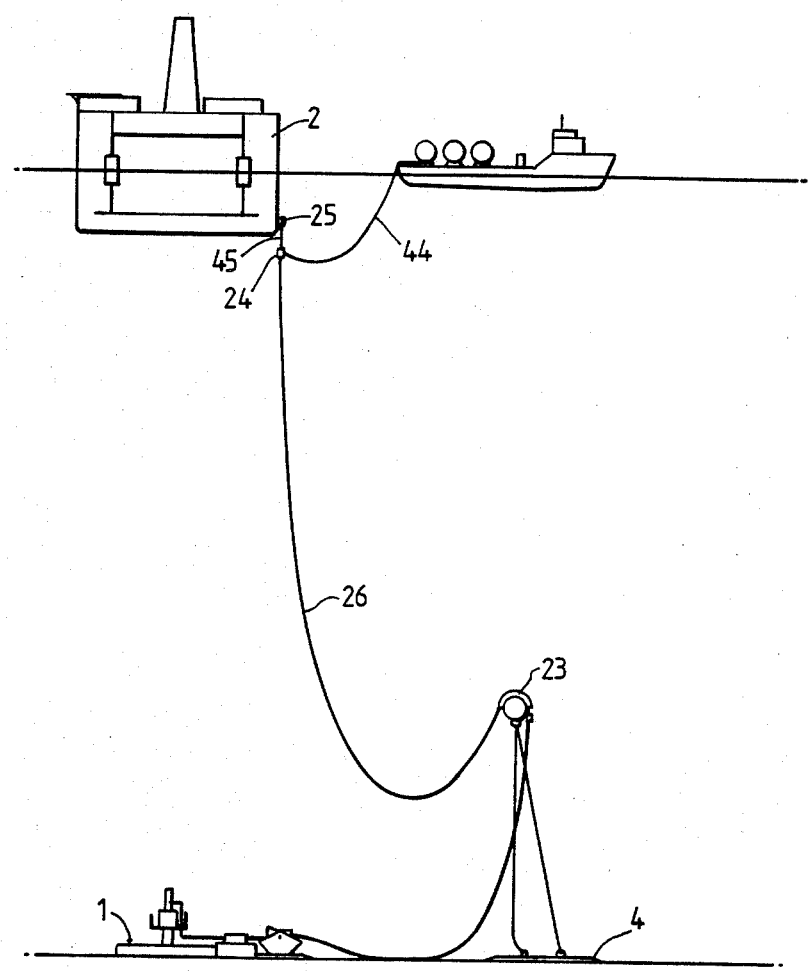
FIG. 3 shows a third stage after laying the upper section over the buoy and attaching the upper connector to the production vessel.

FIG. 3 shows the upper riser connector 24 being pulled in to make connection with the production vessel at a connection point 25, the pipe length in the upper leg of the riser being such as to form a catenary 26.

If more than one flexible riser pipe is to be connected to the upper connector 24, all the flexible pipes would first be connected to the seabed equipment 1 and attached to the support 3. Then all the pipes would be laid over the support 3 together and attached there prior to attachment to the upper connector 24.

Figure 4:
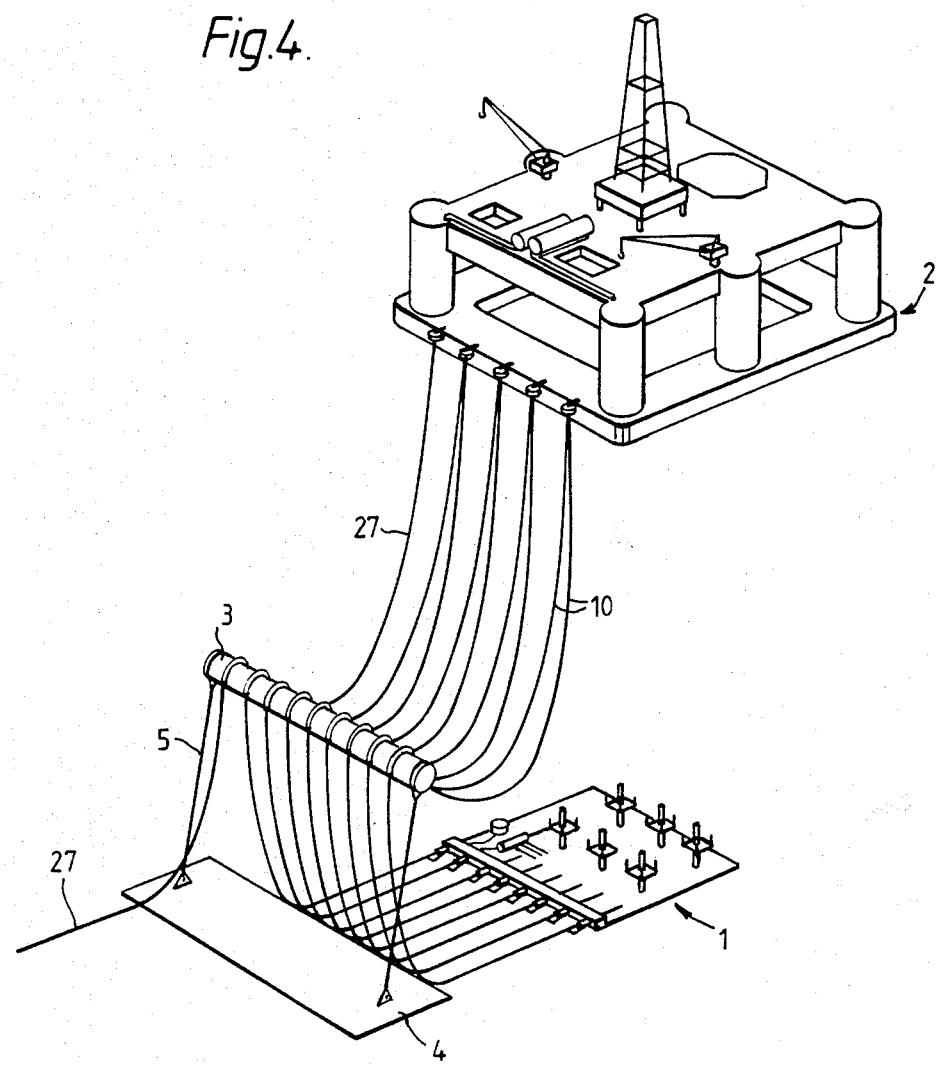
FIG. 4 is an isometric view of a completed nine-riser system using a buoyant mid-water support.

FIG. 4 is an isometric view showing a cylindrical buoy 3 carrying eight riser pipes (or umbilicals) 10. An export riser 27 could be installed in a lazy S configuration away from the base 4.

Riser 27 shown in FIG. 4 does not pass back under the mid-water buoy 3 but extends across the seabed away from the production vessel 2 and subsea production equipment 1. It could connect for example to an export single point mooring. Similar risers to riser 27 could extend across the seabed as lines to satellite wells or manifolds or to an onshore terminal.

To connect the upper end of riser 27 to the production vessel 2 the construction vessel 13 must advance towards the mid-water buoy 3. In order for the lower catenary of riser 27 between the seabed and midwater buoy to take up the correct geometry, it is essential to transfer the lower riser catenary weight to the buoy 3 at the correct position along the riser length. Use of sonar measuring methods as described in Offshore magazine, July 1979 issue, page 45, will enable catch means (to be described) to be added to riser 27 in the correct position.

Figure 5:
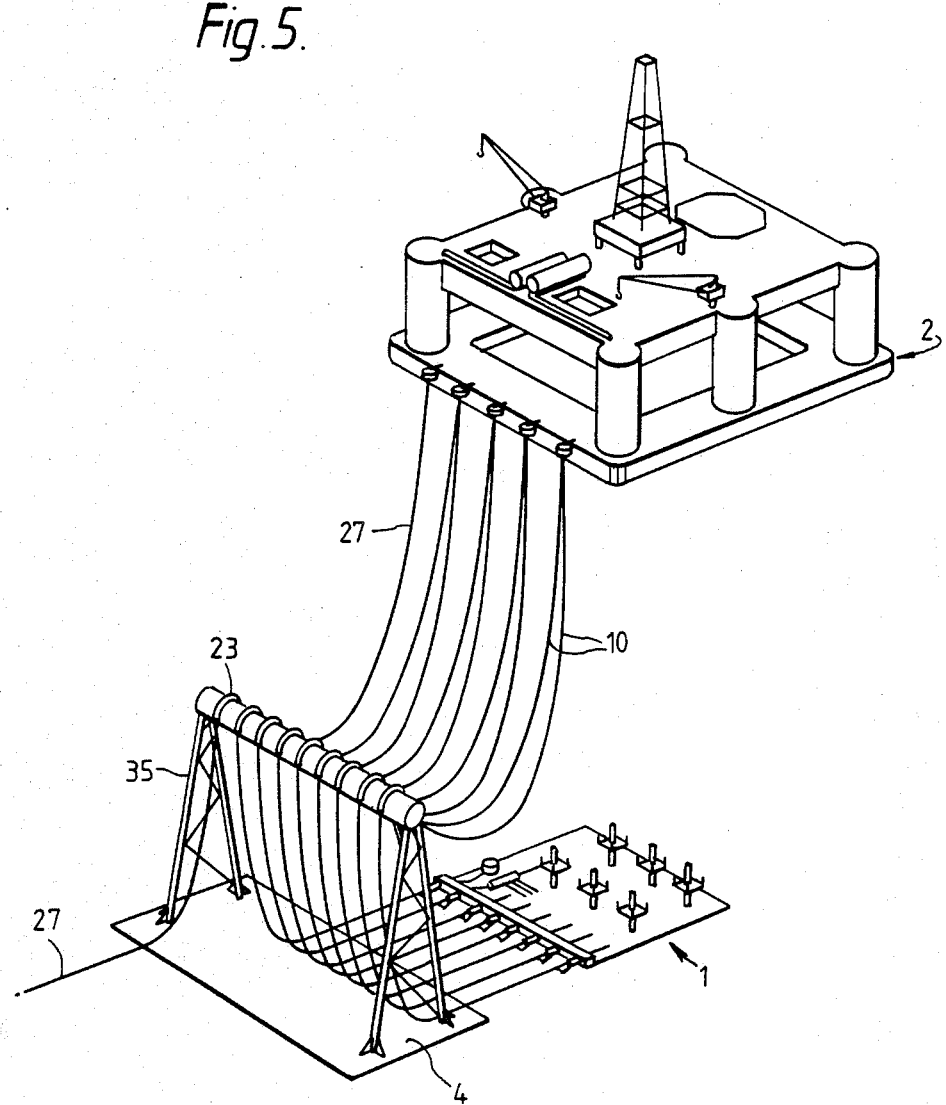
FIG. 5 is an isometric view of a completed system using a fixed mid-water support.

Referring now to FIG. 5, the required mid-water support could be provided by a fixed rigid structure 35 which resists all applied loads without incorporating buoyancy. In this case, detents for the risers (to be described later) could be rigidly attached to the cradles 23 or on a nearby point of structure 35 without being suspended on chains or cables.

As mentioned previously, part of the means to laterally move the lower connector across the seabed (i.e. the sled) could be attached to the lower connector before the riser pipe is lowered from the construction vessel 13. FIG. 6 shows means of assisting orientation of the lower connector and an associated sled as it approaches the base.

Orientation of the lower connector 11 attached with sled 7' (see FIG. 6) is assisted by channels or grooves 28 on the base 4 which define the correct direction (shown by arrow A) towards the subsea equipment 1 and connection point 17. A bump or slight rise 29 in each channel guide restrains movement of the nose 30 of the sled 7' along the channel selected as the support vessel 13 moves away from the production vessel 2. The sled 7' and riser 10 with it will then tip over away from the subsea equipment so that as extra flexible riser is unreeled at the surface, it takes up the correct position for pull-in by line 16 of the sled, which will then run on the runners 7a. An integral sled may be constructed to tilt spontaneously onto its runners. Making the sled permanently associate with the lower connector 11 allows later recovery of a faulty riser and installation of a replacement riser by the same method.

Various means for attaching the riser to the support will now be described. FIG. 7 shows how a steel spool 19 may be let in part-way along flexible pipe 10. The spool 19 has a narrow tubular stem which can enter into the mouth of a carrier 21 and an enlarged portion 20 which can nestle into a detent cup at the upper end of the carrier 21. The carrier 21 is suspended from the support, below the end of the cradle 23, by for example chains 22.

When the attachment has been made, some of the weight (i.e. all of the free weight from the support down to the seabed) of the riser pipe 10 can be carried by support buoy 3. The construction vessel 13 can then move towards the production vessel 2 and more flexible pipe 10 can be unwound from the reel 12 so that pipe can be laid across the support into the cradle 23 without slipping.

FIG. 8 shows another means of transfer of lower riser catenary weight to the mid-water buoy 3. A steel stop 31 is clamped around the riser at the correct position using screws 32. The stop 31 is manufactured as one piece and then split in half diametrically. The enlarged portion 20' of the stop can nestle into a detent in a carrier 33 similarly as in carrier 21. The carrier 33 may be suspended on wire rope slings 34. Flexible suspension is advantageous in that during wave-induced motion, riser flexing occurs mainly at the touch-down point on cradle 23 rather than at the catenary weight support position.

Referring now to FIG. 9, the arched cradle 23 is shaped to include a protruding guide fork 36 at its lower end, to guide the riser 10 into the cradle 23 and the flanged clamped stop 31 into a recess 37 in the cradle 23 as the riser is lowered into position (see FIG. 2). The flange 20" of the stop rests on the top edges 36a of the fork which also assist in sustaining the weight of the riser even when the stop 31 is engaged in the recess 37. The recess 37 is at a point lying at about 30 degrees above horizontal to remove the stop 31 away from the region of riser flexure in service. The guide fork has outwardly divergent lips 36b to assist entry of the riser pipe into the fork.

This detent means for weight transfer has the advantages of being integral with the cradle 23 and being easier to protect against corrosion.

In any of the systems described, the stop or catch on the pipe, e.g. the enlarged portion 20, may be part of a separable connection, either flanged or hydraulically-actuated, such that the upper catenary 26 can be separated from the lower catenary 18. A hydraulic connector included in the enlarged portion 20 could be actuated by a pressure source carried by a diver or ROV such as 14. Any of the systems can be used either with risers 10 or risers 27.

The base 4 may extend across the seabed and link with the subsea equipment 1, thus incorporating the spacing frame or mudline cover previously described within itself, or in the variant described with reference to FIG. 6 providing grooves or channels for guidance all the way to the connection point 17.

The construction of the support 3, when it is a buoy can be advantageously carried out in the ways to be described with reference to FIGS. 10 to 15. In the embodiment of FIGS. 10 to 13 a modular system is shown wherein buoyancy units 39 of variable buoyancy are attached to a beam 3'; the units are not laterally symmetrical and in that way can compensate for the laterally unequal loading supported by a buoy in the present types of systems. The cradles 23' are part wheel-like objects attached as required to flanges on the beam 3'.

Advantageously, while mobilised to install the equipment 1, the crane vessel can also install the buoyant beams 3 with their associated tethers 5,6 and base 4. In this case, the crane vessel lifts a base 4 with a beam 3 and tethers 5 lying in contact with it. This assembly may exceed 30 meters in length and 100 tonnes in weight when in air. The buoyant beam 3 should be held in place by releasable latches or straps (not shown) so that on entering the water the beam 3 remains in contact with the base 4 and does not interfere with the crane rope. Later, possibly after drilling wells and installing the flowlines to satellite wells (if any), the latches or straps are released and the buoyant beam 3 will rise through the water until reaching the limit of the tethers 5. The beam needs only sufficient buoyancy to overcome its own weight and the weight of the tethers. This permits the beam to be fabricated from tubular steel about 1 to 2 meters in diameter. To develop buoyancy, the ends must be sealed to prevent ingress of water. By thus minimising the diameter of the tubular structure there is good ability to resist collapse due to external pressure. It may also be filled with pressurised gas to permit installation in deeper water.

FIG. 12 is a section through the buoyant beam 3 with riser support arch 23 bolted on its flange 38.

FIG. 11 is a section through the buoyant beam 3 and buoyancy unit 39. The unit 39 has an open bottom so that gas can be added as required by holding a gas line underneath or by delivery through special piping (not shown). The unit 39 may be divided into two by a partition 40, the divisions having vents 41 so that buoyancy can be adjusted on each lateral side of the buoyant beam 3. Buoyancy adjustment can be made to match the distribution of riser load each side of the beam 3. The module 39 may be fabricated from sheet metal or plastic or fibreglass or similar, as there is equal pressure inside and outside. A sight glass or a transparent section (not shown) would allow monitoring of the amount of gas trapped inside the module 39.

When the buoyant beam 3 reaches its mid-water position at the limit of the tethers 5, it will usually be less than 200 meters below sea surface. The support arches 23' and buoyancy units 39 could be added as required by divers, or they could be pre-installed. A single riser pipe extending from the seabed to the midwater support arch can weigh around 5 tonnes or greater. This part of the riser weight, plus part of that of the upper leg can be supported by the adjustable buoyancy units 39 each side of the support arch 23'; thus minimising the buoyancy required of the beam 3'. Not only can total buoyancy be adjusted but also its lateral distribution.

If all the required buoyancy were to be designed into a beam 3, this item has to be around 3 to 4 meters in diameter and 60 mm to 80 mm thick with associated fabrication difficulties and high cost. Also, if buoyancy is constant, the position of the beam 3 and angle of the tethers 5 will vary more widely as riser weight is added during the setting up of the system.

So far, we have shown mid-water arch supports 23 or 23' which have part-circular section with slightly greater internal radius than the external radius of the flexible riser pipes 10,27 which rest in them.

This is adequate to accommodate movement of the risers in the case of weather (wind, waves, current) acting largely in the line or in the plane of the risers. However, the weather direction may be at 90 degrees to the plane of the risers. Typically, this may cause the vessel 2 to move up to 30 meters off the common equilibrium (zero weather) centre plane extending through the vessel 2, the supports 3, bases 4 and equipment 1. In the equilibrium condition, the horizontal distance between the vessel connection point of a riser 10 and its corresponding mid-water arch support may be 60 meters. Therefore the angle of approach of a riser 10 to the beam 3 in transverse weather conditions could be around 30 degrees to the normal or equilibrium approach line.

Unless the U-shaped catenary of the upper leg of the riser from the vessel to the arch support 23,23' is steep, this 30 degree angle of approach could cause the riser to climb out of the arch support internal radius.

Advantageously, the cross-section of the arch support will vary as shown for support 23" in FIG. 13 where section D (FIG. 13d) is positioned on the side of the support nearer to the vessel 2. This flaring of the groove in the arch support 23" spreads the touch-down load point of the U-shaped catenary and reduces the intensity of riser pipe flexure. A similar though lesser outward flaring at the end of the support nearer the lower leg (section C, FIG. 13c) has the same effect. In the region of section B, FIG. 13b, the support has a cross section much as described for earlier embodiments.

Alternatively, especially if the flexible riser pipe has low resistance to torsional load or the outer covering has low wear resistance, the mid-water support system shown in FIGS. 14 and 15 can be used. Of course, channels of these or similarly varying sections can be used in all the embodiments of system which have been described.

Twin beams 3" are joined together at intervals by structures which incorporate bearings 42. The bearings must operate freely in a seawater environment and may e.g. be aluminium-bronze bearings with integral graphite lubricant as used for SALM (single anchor-leg mooring) and articulated column joints.

Buoyancy can be made integral with the arch support by providing sheet material 44 on both sides of the support while still allowing the angle of pivotal movement to be about 35 degrees each side of the centre. In a transverse weather condition, the arch support 23''' will align itself with the U-shaped catenary of the upper leg and slight torsion will be applied to the J-shaped catenary of the lower leg extending down to the seabed.

Multi-line pipe connectors (which have been used previously) make installation and individual line replacement more difficult and two-wire pull-in systems occupy more space and take longer to rig than single line systems. It is desired therefore to enable heavy flexible pipes to be individually connected to a floating vessel using a relatively small, lightweight connector and to require only a single wire to pull the lower part of the connector into engagement with the upper part.

We therefore provide a connection system for the flexible riser pipe comprising an upper part of a connector rigidly attached to the production vessel with a single guide funnel adjacent to the connector part, and a single pull-in cable extending from a winch, also mounted on the production vessel, and passing through the guide funnel; a lower part of a connector attached to one end of the flexible riser pipe and having a single guide post mounted with its axis offset from the pipe and lower connector part axis by a similar distance to that between the guide funnel and upper connector part axis, and the said post including means for co-axial attachment of the pull-in cable such that the cable extends from the top of the post; and a removable lever arm attached at one end near to the bae of the guide post by a pivot pin whose axis is at right angles to the pipe/connector axis and spaced away from it by a similar but not necessarily equal distance to the guide post axis, and having means at the other end for attaching a handling and transfer cable extending from a second vessel or structure, such that this attachment can swivel at least about an axis which is at right angles to both the pivot pin axis and to the lever arm.

FIG. 15 is an elevation of the upper and lower connector parts after engagement of the guide post and funnel. A plan view of the lower connector part is also shown.

FIG. 15 shows the upper connector engagement in greater detail. The pull-in cable 45 is attached coaxially to guide post 46 which extends at an offset position from the connector part 24. Cable 45 pulls the guide post 46 into engagement with the funnel 47 mounted adjacent to the upper part of the connector 25. Tension in cable 44 when the pipe 26 and connector part 24 are lowered into the water from vessel 13 will be 5 to 10 tonnes or greater. When the weight of pipe catenary 26 and connector part 24 are transferred to cable 45, (which may be attached to post 46 on the deck of vessel 13, or by divers when submerged) the tension in this line will rise to a similar value, but slight tension (less than 1 tonne) is held on cable 44 which is attached through lever arm 48. In the position shown with connector and pipe axis close to vertical, the axis of retractable pivot pin 49 which attaches lever arm 48 to connector part 24 is horizontal and the axis of pin 50 is close to vertical to allow the cable 44 to pull directly on the lever arm 48 without bending or buckling the cable 44. Tension in cable 44 tends to maintain the connector part 24 in the current orientation with respect to connector part 25 prior to and after the guide post 46 enters funnel 47. Connection will be visually monitored, and if required, tension in cable 44 can be applied at an angle to the vertical plane to generate additional torque around the guide post axis.

Flexible pipe catenary 26 usually hangs away from the vessel 2 and the top angle of the catenary at the point of connection is a few degrees off vertical. If the pull-in cable 45 is outboard of the connector parts 24 and 25 as shown, the natural hanging angle of the pipe 26 due to the offset between guide post 46 and connector part 24 will also be a few degrees of vertical in the same direction. This will assist entry of connector part 24 into part 25. When fully entered, part 24 is hydraulically clamped in engagement with part 25. There may be hydraulically operated shut-off valves in both part 24 and part 25. A buoyancy collar 51 is mounted outside the pipe bend restrictor 52. This collar could have a square or rectangular periphery in section to allow closer spacing between adjacent connectors. After connection has been made, lever arm 48 and cables 44 and 45 are released and recovered.

Removal of an individual pipe would begin by attaching cables 45 and 44 (possibly via lever arm 48) and releasing the connector such that par 24 and the pipe 26 could be transferred back to an installation vessel, and then winding the pipe on a reel. A replacement pipe could be installed by repeating the initial installation procedure.

Supports such as 3,35 may be provided at only one side of the vertical below the production vessel, or at more than one. Preferable would be not more than two sides, diametrically opposed.

The detents may be provided anywhere on the relevant lateral side of the support, and on an arcuate support can be between the horizontal radius and a radius making an angle of about 45° above the horizontal, more preferably of about 30° above the horizontal.

I claim:

1. A method of installing a flexible riser system in water to bring flexible risers from seabed equipment to a production vessel at the sea surface, including
   (a) providing a support to one lateral side of a line running vertically from the production vessel and at a level intermediate the seabed and the sea surface,
(b) lowering at least one flexible pipe from the sea surface in a region laterally further from said line than said support to at least contact the seabed,
(c) bringing said pipe to the support at a lateral side portion thereof remote from the said line,
(d) attaching said pipe and said support together whereby to sustain on said support at least the weight of the pipe below said support, and thereafter
(e) laying an upper portion of the pipe over the support towards said line to form a catenary upper leg of a riser.

2. A method as claimed in claim 1 including after step b and before step c;
a drawing the pipe along the seabed below said support to bring a free end of said pipe to said equipment.

3. A method as claimed in claim 2 including in step b, dropping the free end of the pipe into a container on a sled and in step f pulling the container and pipe held thereby to the equipment.

4. A method as claimed in claim 2 including in step b, dropping the free end of the pipe together with an attached sled in a vertical attitude, and tipping the sled to a horizontal attitude when at the seabed, and in step f pulling the tipped sled and the free end of the pipe to the equipment.

5. A method as claimed in claim 1 wherein steps c and d are performed by bringing said pipe laterally towards said support to enter a laterally directed channel projecting therefrom, and engaging a projection on said pipe with a detent associated with said channel against relative downward movement of the pipe.

6. A method as claimed in claim 5 wherein the support is a tethered buoy, including the step of adjusting the buoyancy of the buoy.

7. A method as claimed in claim 6 wherein the adjustment step includes adjusting the relative buoyancy of the lateral sides of the buoy.

8. A method as claimed in claim 6 wherein the adjustment step includes adding at least one buoyancy module to said buoy.

9. A method as claimed in claim 8 wherein said modules are divided into laterally separate parts, and the adjustment step further includes adjusting the relative buoyancy of the separate parts.

10. A method as claimed in claim 1 wherein step e includes moving a construction vessel with the pipe attached towards the production vessel and thereafter
(g) attaching a traction line from the production vessel to pull the pipe towards an upper connector part on the production vessel, maintaining contact between a lower connector part on the pipe and the construction vessel by a traction line between a radial arm on the lower connector part whereby to maintain an orientation of the lower connector part, and engaging first a single guide post and socket means on the connector parts further to orientate and align the parts and then engaging mating pipeline male and female connections on the connector parts whereby to form a fluid-conducting connection between the pipe and the production vessel.

11. A method as claimed in claim 1 wherein step a includes lowering to the seabed an assembly of a buoy and a base and a tether system attaching said buoy to said base, with restraint means holding the buoy to the base with the tether system unextended, positioning the base on the seabed and releasing the restraint means whereby to extend the tether system.

12. A method according to claim 11 wherein the buoyancy of the buoy when positioned is only slightly superior to the effective weight of the buoy and the tether system.

13. In a flexible riser system comprising
(a) a production vessel at the sea surface
(b) underwater equipment at the seabed
(c) a support for at least one riser at a level between the seabed and the sea surface, the support having a first and second lateral side
(d) at least one flexible riser joining the equipment to the vessel said at least one riser lying over said support to form a catenary upper leg of the riser from said support to the vessel at the first lateral side of the support and hanging therefrom at the second lateral side thereof t define a catenary lower leg of the riser;
the improvement comprising
(e) means at said second lateral side of the support for engaging said riser for preventing downward movement of said riser a said side whereby to transfer at least the weight of said lower leg to said support.

14. The improvement as claimed in claim 13 wherein said means comprise a projection on said riser and an outwardly directed channel on said support, said channel being dimensioned to receive said riser therein and comprising detent means at second side of the support for engagement with said projection to prevent movement thereof in the downward direction lengthwise of said channel.

15. The improvement as claimed in claim 14 wherein said detent means lies in a region subtending an angle of arc of 45° upwardly from the horizontal.

16. The improvement as claimed in claim 14 wherein said channel and detent are provided by a carrier flexibly attached to said one side of said support.

17. The improvement as claimed in claim 14 wherein said channel and detent are provided by addition to an end portion of an arcuate guide channel extending over said support.

18. The improvement as claimed in claim 17 wherein said detent is at an angle of about 30° to the vertical around said arcuate channel and the detent means are provided at least partly by upper edge of radially elongate wall portions of said channel.

19. The improvement as claimed in claim 13 wherein the equipment is generally vertically below the production vessel and lower leg extends under the support to said equipment.

20. The improvement as claimed in claim 19 wherein the upper leg is a slack catenary with a length such that at a design maximum wave height movement of the production vessel the lowest point of the catenary remains above the seabed.

21. The improvement as claimed in claim 19 wherein a free end of the riser at the seabed comprises a sled means, and pulling means are provided at the equipment for attachment to the sled and pulling it towards the equipment.

22. The improvement as claimed in claim 21 wherein a seabed base for the support comprises guide means for said sled for assisting its orientation in relation to said equipment.

23. The improvement as claimed in claim 13 wherein to form a connection between the production vessel and an upper end of the riser pipe a connection system comprises an upper part of a connector rigidly attached to the production vessel with a single guide funnel adjacent to the connector part, and a single pull-in cable extending from a winch, also mounted on the production vessel, and passing through the guide funnel; a lower part of a connector attached to one end of the flexible riser pipe and having a single guide post mounted with its axis offset from the pipe and lower connector part axis by a similar distance to that between the guide funnel and upper connector part axis, and the said post including means for co-axial attachment of the pull-in cable such that the cable extends from the top of the post; and a removable lever arm attached at one end near to the base of the guide post by a pivot pin whose axis is at right angles to the pipe/connector axis and spaced away from it by a similar but not necessarily equal distance to the guide post axis, and having means at the other end for attaching a handling and transfer cable extending from a second vessel or structure, such that this attachment can swivel at least about an axis which is at right angles to both the pivot pin axis and to the lever arm.

* * * * *

UNITED STATES PATENT AND TRADEMARK OFFICE
CERTIFICATE OF CORRECTION

PATENT NO. : 4,793,737
DATED : December 27, 1988
INVENTOR(S) : Keith Shotbolt

It is certified that error appears in the above-identified patent and that said Letters Patent is hereby corrected as shown below:

```
Column 9, line 17, insert --(f)-- before "a drawing".

Column 10, line 20, change "t define" to --to define--.

Column 10, line 25, change "a said side" to --at said side--.
```

Signed and Sealed this

Twentieth Day of June, 1989

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,793,737
DATED : December 27, 1988
INVENTOR(S) : KEITH SHOTBOLT

It is certified that error appears in the above-identified patent and that said Letters Patent is hereby corrected as shown below:

Column 9, line 17, before "drawing", delete "a".

Signed and Sealed this

Thirteenth Day of February, 1990

*Attest:*

JEFFREY M. SAMUELS

*Attesting Officer*     *Acting Commissioner of Patents and Trademarks*